UNITED STATES PATENT OFFICE.

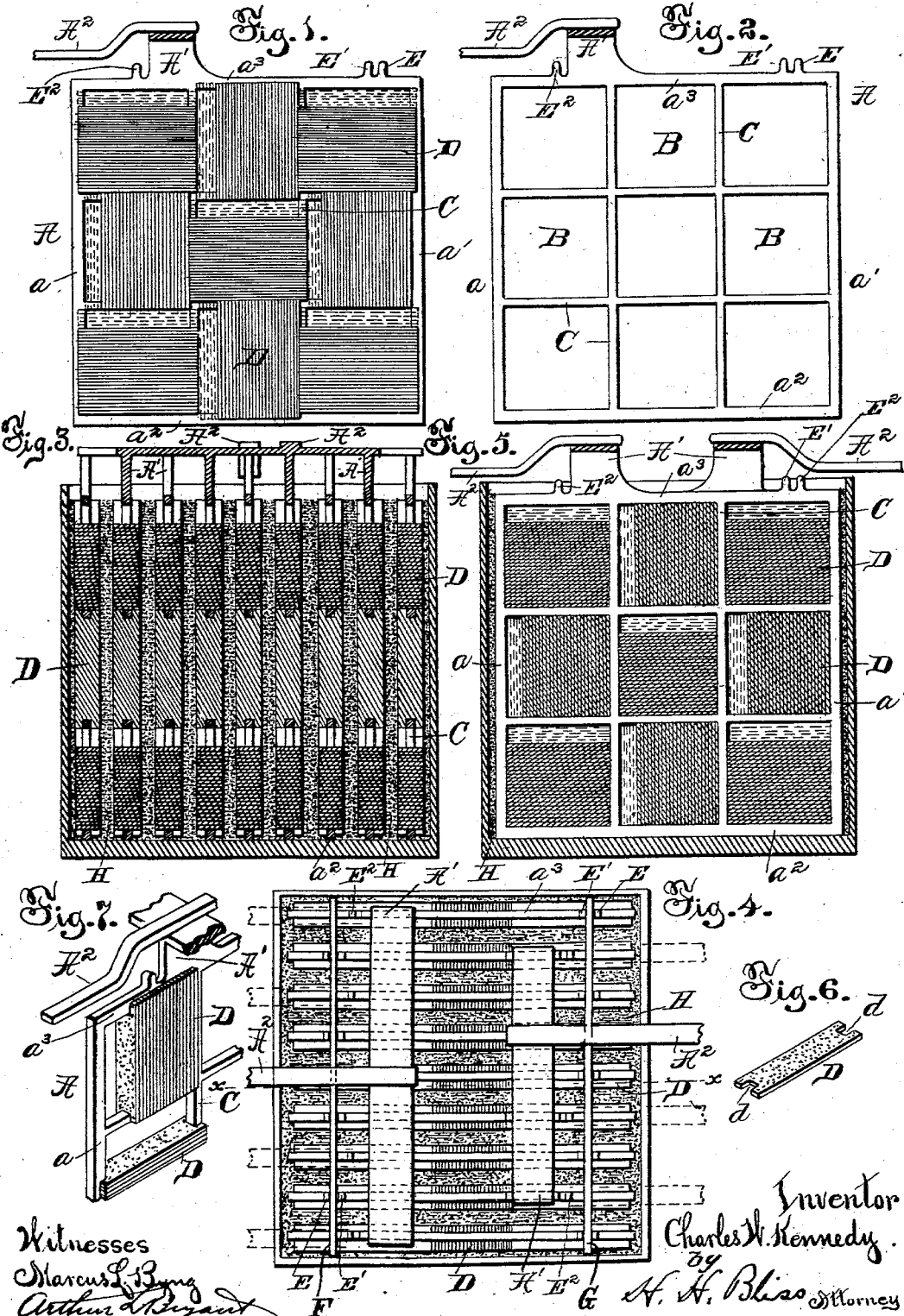

CHARLES W. KENNEDY, OF RUTLEDGE, PENNSYLVANIA, ASSIGNOR, BY MESNE ASSIGNMENTS, TO THE ELECTRIC POWER DEVELOPMENT COMPANY.

ELECTRODE FOR STORAGE BATTERIES.

SPECIFICATION forming part of Letters Patent No. 629,260, dated July 18, 1899.

Application filed April 30, 1898. Serial No. 679,336. (No model.)

*To all whom it may concern:*

Be it known that I, CHARLES W. KENNEDY, a citizen of the United States, residing at Rutledge, in the county of Delaware and State of Pennsylvania, have invented certain new and useful Improvements in Electrodes for Storage Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is an elevation of an electrode constructed in accordance with my invention. Fig. 2 is a similar view with the frame or holder, the masses of lead tape being removed. Fig. 3 is a sectional view through a cell having a series of my improved electrodes. Fig. 4 is a plan view of the same. Fig. 5 is a vertical section on the line $x\ x$ of Fig. 4. Fig. 6 is a face view of one of the lead strips detached. Fig. 7 is a perspective of a part of one of the frames with these strips.

As is well known, one of the objectionable features incident to electrodes for secondary or storage batteries as heretofore constructed has been the excessive weight incident to providing a suitable amount of "active surface." This objection has been one of the principal reasons why this class of electrical apparatus has not gone into more extensive use.

The object of the present improvements is to provide an electrode which shall have a maximum amount of active surface and a minimum amount of weight, and also to so arrange the masses of "active material" that buckling or warping of the electrode will be prevented and such active material held securely in place.

Referring to the drawings, A designates an inclosing frame or holder. As shown, this is made rectangular in form and of thin bars of lead, there being two parallel upright side pieces $a\ a'$, a bottom connecting-piece $a^2$, and a top cross-bar $a^3$. All of these bars may be cast integral. The interior of this frame A is divided into a series of holders or receptacles B by means of partitions C, which may be formed integral with the bars or sides of the outer frame A, if desired. In each of these interior holders B are arranged a series of strips of lead tape D, which form the active surface of the electrode. The strips D of lead tape are securely held in position by means of having grooves or notches $d$ formed in their ends and engaging with the opposite bars C of the holder B, in which they are placed. The strips of tape are arranged close together and substantially fill the holder B, provision being of course made for the necessary expansion of such strips.

The lead tape D may have its surface roughened by being passed between suitable rollers, and the grooves or notches $d$ in the ends thereof may be formed in any suitable way, this portion of my present improvements being similar to that described and illustrated in another application filed by me on April 13, 1898, Serial No. 677,466.

By reference to the drawings it will be seen that the strips of lead tape D in the different compartments or holders B do not all extend in the same direction; but the strips in each of such compartments or holders B extend in a direction at right angles to the length of the strips in the adjoining compartments. By this arrangement it will be seen that I effectually prevent any buckling or warping of the electrode, the frame-bars thereof being engaged in all directions by the masses of lead tape D and the expansion of one of such masses in one direction being counteracted by the expansion of another mass in a different direction.

The full lines in Fig. 1 illustrating the lead strips show their position prior to the "forming" of the battery. The dotted lines show their position after the forming and when the battery is ready for use. The expansion which invariably occurs in using these batteries is provided for by leaving each holder or receptacle for the strips partially empty; but this space is taken up as soon as the oxids and other chemical products are formed. One important end reached with a construction of this sort is the great reduction of the internal resistance of each part of the electrode. It will be seen that the current passes through a large number of contact-points, because of the number of the lead strips. To insure a perfect contact at the ends of the strips, I, after the strips have been loosely inserted, as shown in full lines in Fig. 1, apply pressure to the sides adjacent to the slotted ends, as by hammering or otherwise, to force the slot edges tightly against the surrounding frame to insure a good electric contact.

The frame A is provided with an integral connector-lug A' in the ordinary manner, and in addition the top bar $a^3$ is provided with three upwardly-extending lugs E E' $E^2$. The lugs E E' are arranged relatively near the opposite side of the frame A from the connector-lug A', while the lug $E^2$ is arranged close to said lug A', but on the opposite side thereof from the lugs E E'. A cross-bar F, of any suitable material, may be secured to said lugs E E' either to hold the electrodes in proper position relative to each other or to provide electrical connection between them and, if desired, a similar bar G may be passed between the lugs A' and $E^2$. The different plates or parts of each electrode may be connected together by transverse conducting-bars in any of the usual ways. One of the lugs A' is provided with a conducting lead or terminal $A^2$, though more of these can be carried out from the cell and connected electrically for any desired purpose.

While I have above described but one electrode, it will be understood that the positive and negative electrodes may be positioned in any preferred manner.

From the above description it will be seen that the supporting-frame of the electrode contains but a relatively small amount of metal, and therefore the weight of the entire electrode is materially reduced, and, at the same time, by forming the masses of active material in the manner and arranging them in the peculiar way described and illustrated the amount of surface exposed for action will be much greater than it has heretofore been possible to attain without increasing the total weight and size of the electrode to a prohibitive extent.

The spaces in the cell which are between the plates or parts of the electrodes I fill with clean sand or other equivalent hard non-conducting non-corrosive material of a granular nature, as shown at H. This accomplishes several purposes, it making a spongy receptacle for the liquid which is uniformly distributed through the mass of sand and is prevented thereby from spilling or slopping, which assists in keeping the electrodes in exactly their predetermined positions and avoids any short-circuiting of the sort often resulting from the dropping of scale and the lodging thereof at points between two of the electrodes.

I am aware of the fact that long strips of tape have been proposed as the active material for a storage battery, said strips to be looped back and forth and the loops pressed together and mounted in an exterior rectangular frame, together with sand placed between the two parts of each loop or between the adjacent laminæ for the purpose of separating and spacing them and preventing them from lying too closely together in contact, these earlier electrodes being placed in the usual way in masses of liquid; but in my case the sand or equivalent is used for materially different purposes, the exposure of lead surface being accomplished not by the sand, but by having the above-described indentations formed in the lead strips. The sand is to prevent the presence of liquid in masses or bodies and to break it up and distribute it through the mass of the sand, so that although present for electrolytic purposes there is practically no fluid in the cell.

I do not herein claim a battery-electrode consisting of a series of strips of lead tape bound together face to face and provided at their ends with grooves adapted to receive retaining-bars, preferring to claim the novel features incident to such a construction in my aforesaid other application.

What I claim is—

1. An electrode for a storage battery, consisting of several parallel series of masses of active material, one series being vertically above another each mass comprising a series of parallel strips of lead tape, the strips in one mass extending at right angles to the strips in the next adjacent masses, and a frame or holder supporting all of said masses, substantially as set forth.

2. The herein-described battery-electrode, consisting of a frame having several parallel series of holders formed therein, one series vertically above another and a series of strips of lead tape arranged within each of said holders, the strips in each holder extending in a direction different from that of the strips in any of the surrounding holders, substantially as set forth.

3. The herein-described electrode consisting of an inclosing frame, A, having its interior divided by intersecting cross-bars into several horizontal series of holders, and a series of strips of lead tape arranged within each of said holders, and engaging with the bars forming the same, the strips in one holder extending in a different direction from the strips in adjacent holders, substantially as and for the purpose set forth.

In testimony whereof I affix my signature in presence of two witnesses.

CHARLES W. KENNEDY.

Witnesses:
GEO. W. CLEMENT,
GEORGE RIDDELL.